United States Patent

[11] 3,557,662

[72] Inventor Frederick J. Adams
Campton, near Shefford, England
[21] Appl. No. 754,638
[22] Filed Aug. 22, 1968
[45] Patented Jan. 26, 1971
[73] Assignee Cam Gears, Ltd.,
Hitchin, Hertfordshire, England
a British company. by mesne assignments to
[32] Priority Aug. 22, 1967
[33] Great Britain
[31] 38,542/67

[54] STEERING SYSTEM
4 Claims, 1 Drawing Fig.
[52] U.S. Cl. ................................................. 91/375
[51] Int. Cl. ................................................... F15b 9/10
[50] Field of Search ...................................... 91/375A

[56] References Cited
UNITED STATES PATENTS
3,022,772  2/1962  Zeigler et al. ................. 91/375A
3,138,067  6/1964  Bishop ........................... 91/375A
3,357,316  12/1967  Brown, Jr. .................... 91/375A
3,393,608  7/1967  Saunders ....................... 91/375A Primary Examiner—Paul E. Maslousky
Attorney—Hill, Sherman, Meroni, Gross & Simpson ABSTRACT: Apparatus for use in a power-steering system including a pinion and a cooperating rack for use in association with a power-assisting dual-acting pressurized fluid-operated servomotor. A steering column is connected to the pinion for limited relative rotation through a torsionally resilient coupling. The pinion is connected for joint rotation to one of a pair of relatively rotatable valve members of a fluid flow valve which controls the flow of pressurized fluid to and from the opposite ends of the servomotor. The steering column is connected to the other valve members through a rigid virtually nonstraining rod.

PATENTED JAN 26 1971
3,557,662
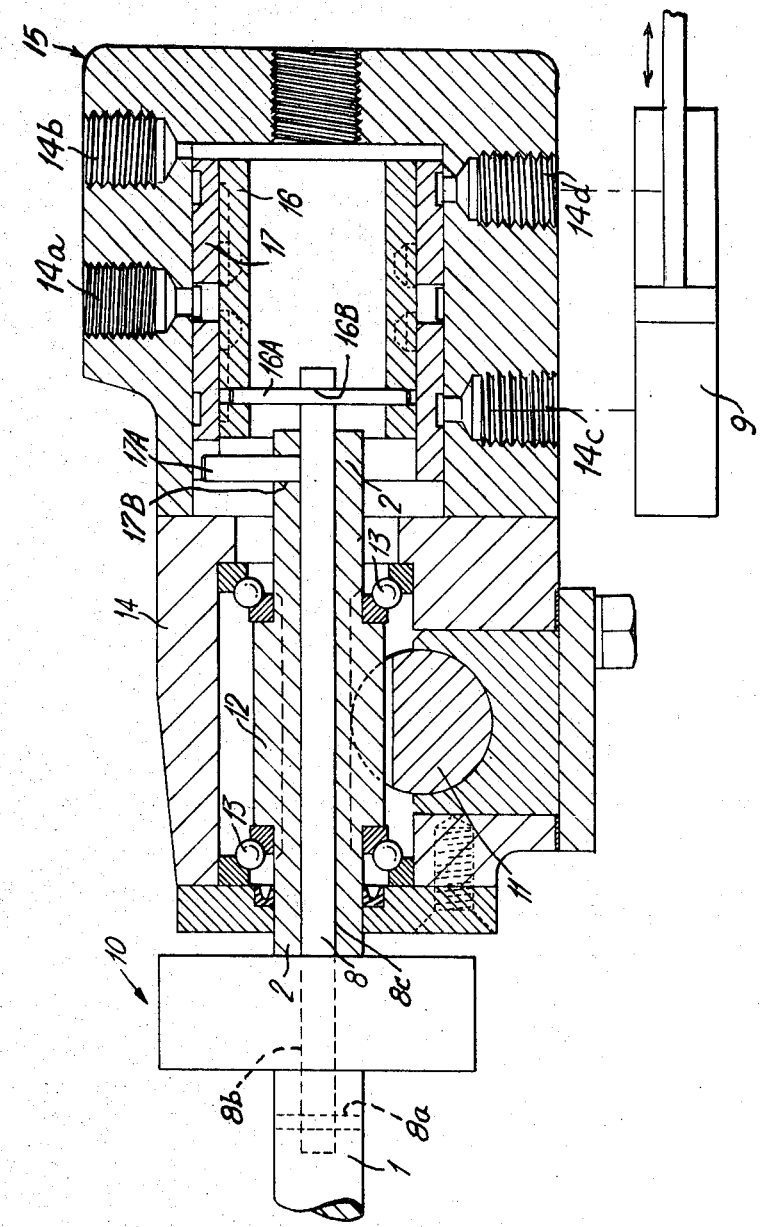
Inventor
Frederick John Adams
By
Hill, Sherman, Meroni, Gross & Simpson Attorneys 3,557,662

STEERING SYSTEM

BACKGROUND OF THE INVENTION

This invention relates generally to power assist or amplification systems and more particularly to such systems as are utilized, for example, in some vehicular power-steering systems in which a work input shaft, such as the steering column of a manually rotated steering wheel, is connected to a work output shaft, such as the pinion of a rack-pinion assembly in a steering linkage, and is also operatively connected to one of a pair of relatively rotatable valve members of a fluid flow valve which controls the flow of pressurized fluid to and from the opposite sides of a dual-acting servomotor also connected to the steering linkage, for supplementing the power transmitted to the work output shaft by the input shaft as a function of the sense of direction and magnitude of the torque applied manually to the work input shaft. The work output shaft is connected to the other valve member, the valve members being biased to a mutually neutral position and being relatively movable in opposite directions therefrom to a pair of operating positions at which the pressurized fluid is alternatively directed to the opposite sides of the servomotor.

In known arrangements the interconnections between the work input and work output shafts and the fluid flow valve are complicated, relatively expensive to manufacture, made up of a substantial number of parts and are relatively large in size. To improve these and other characteristics of power amplification systems particularly as applied to power-steering systems is an object of the present invention.

SUMMARY

The present invention may be summarized as comprising a housing having means forming fluid flow torques therein, a valve in the housing including a pair of relatively rotatable valve members for controlling the flow of pressurized fluid between the valve and the opposite ends of a dual-acting servomotor and movable alternatively from a mutually neutral position, at which the servomotor is rendered inoperative in respect of the pressurized fluid, in opposite directions to a pair of mutually operable positions, at which the servomotor is operated in a corresponding direction by the pressurized fluid, a work input shaft and a work output shaft both rotatably mounted in the housing, means connecting the shafts respectively to different ones in valve members for joint rotation therewith, torsionally resilient coupling means rotatably interconnecting the work input and work output shafts for limited relative rotation therebetween and means formed directly on the work output shaft for mechanically operatively connecting the latter to a mechanical work output linkage.

With respect to its application to steering gear, the present invention has the ability in various forms of steering arrangements including pinion-and-rack, straight geared, pinion or worm and quadrant, or purely linkage steering systems. Moreover, it may be used with a variety of species of control valves, such as sliding spool, rotary torque-operated, axially torque-operated or linear-displacement reaction-operated valves. In the embodiment herein illustrated, however, the valves are of the rotary torque-operated-type.

With respect to vehicular steering gear, the same conventionally includes a rotary driver element (such as a pinion, worm or drop-arm) which mechanically operates by engagement or interconnection a driven element (such as a rack, quadrant or link). In accordance with a feature of the present invention the driver element, which may be referred to as the work output shaft, has extending axially therethrough a rod which transmits torque without appreciable strain from the initial torsional input (e.g. steering column) to one of the valve members of the fluid flow control valve, while the driver element itself is connected for joint rotation with the second valve member, there being provided a torque-sensitive rotary coupling between the steering column, which may be referred to as the work input shaft, and the work output shaft, so as to deflect or strain torsionally to an extent proportional to, and in sense equivalent to, the steering effort, and this deflection or strain resulting in rotation of the first valve member relative to the second valve member.

In the form of the invention illustrated herein wherein the steering gear comprises a pinion-rack arrangement, a torsionally resilient coupling which is capable of transmitting all necessary steering torque in the event of failure of the main fluid pump, is connected on the work output side thereof to the steering pinion and is connected on the input side thereof to one of the valve elements of the fluid flow control valve.

It is, therefore, an object of the present invention to provide an improved power amplification system having particular utility in respect of vehicular power-steering systems.

Another object is to provide a power amplification system which is simple in construction, relatively inexpensive in manufacture and reduced in size.

Another object is to provide a combined steering gear and fluid flow control valve for power-assisted steering systems wherein control valve comprises a pair of relatively rotatable valve members, one of which is connected for joint rotation to a rotatable member of the steering gear.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative examples only.

BRIEF DESCRIPTION OF THE DRAWING

The drawing comprises a partially schematic cross-sectional view of a power amplification system constructed in accordance with the principles of the present invention.

DESCRIPTION OF THE PREFERRED EMBODIMENT

In the drawing a torsionally resilient coupling is indicated generally at reference numeral 10 and connected fast thereto for joint rotation with the input side thereof is a work input shaft 1. A work output shaft 2 is connected fast to the outlet side of the coupling 10 for joint rotation therewith and it will therefore be apparent that limited relative rotation between shafts 1 and 2 is provided by the coupling 10.

A rod 8 is connected at one end 8a to the work input shaft 1 and extends through centrally situated bores 8b and 8c formed respectively in the coupling 10 and the work output shaft 2. The shafts 1 and 2, the coupling 10 and the rod 8 are axially aligned with one another and the rod 8 is so constructed so as to substantially resist all twisting along the axis thereof in response to a torque applied thereto. The rod 8, therefore, rotates jointly with the shaft 1 and relatively with respect to the coupling 10 and the work output shaft 2.

In the illustrated embodiment of the invention a pinion 12 is formed on the work output shaft 2, which pinion engages a rack 11, the pinion 12 and rack 11 comprising a steering gear in connection with a vehicular steering system. The work output shaft 2, and thus the pinion 12, is mounted on bearings 13 disposed in a housing or casing 14 having a fluid inlet port 14a adapted for connection to the discharge side of a main fluid pump, a fluid outlet port 14b adapted for connection to the return side of the pump and a pair of servomotor ports 14c and 14d, and situated at one end of the pinion 12 opposite the coupling 10 is a rotary-type hydraulic power-assistance fluid flow control valve generally indicated at reference numeral 15. The valve 15 is constructed and arranged such that small torsionally controlled relative rotation between an inner valve member 16 and an outer valve member 17 control the flow and the sense of direction of pressurized fluid from a source thereof, such as the main fluid pump, to a servomotor such as a dual-acting piston-cylinder assembly shown at reference numeral 9 through the servomotor ports 14c and 14d. The valve 15 may be of the type illustrated and described in my copending British Application Ser. No. 31110/67 entitled "Power Assisted Steering System" and in the pending United States counterpart of this British application, U.S. Ser. No. 741,630 which bears the same title as the British application.

The inner valve member 16 is connected for joint rotation with the rod 8 by virtue of a pin 16A, and the outer valve member 17 is connected for joint rotation with the work output shaft 2 and the pinion 12 by virtue of a pin 17A. Pins 16A and 17A, which extend respectively through bores 16B and 17B formed respectively in the rod 8 and the work output shaft 2 may rotate relative to one another just as the rod 8 and the shaft 2 may also rotate relative to one another.

In operation the work input shaft 1 may be connected, for example, directly to the steering column of a steering wheel adapted for manual rotation in a vehicular steering system. Assume that a torque is supplied to the work input shaft 1 in one direction of rotation. The work output shaft 2 will resist rotation due to the load imposed thereon by the steered wheels of the vehicle through the rack 11 and the pinion 12. The shaft 1 and the rod 8 will rotate relative to the shaft 2, however, as a result of the torsionally resilient coupling 10, and as the rod 8, the pins 16A and the inner valve member 16 rotate slightly relative to the outer valve member 17, pressurized fluid is directed to various fluid openings and passages in the valve 15 to one side of the servomotor 9, thus causing the steered wheels to move in a direction commensurate with the direction of the torque applied to the shaft 1. As the steered wheels turn the rack 11, which is connected to the steering linkage to which the steered wheels and the piston-cylinder servomotor are connected, will rotate, thus causing rotation of the pinion 12 and the work output shaft 2 in the same direction as the shaft 1 is rotating. This rotation of the shaft 2 causes like rotation of the outer valve member 17 and as a consequence the outer valve member 17 will rotate along with the inner valve member 16, but in a slightly lagging relation.

When the applied torque to the shaft 1 is discontinued, rotation of shaft 1, rod 8 and the inner valve member 16 also ceases. The rack 11 will continue to rotate momentarily, however, thus rotating the pinion 12 and the outer valve member 17 until the offset relation between the inner and outer valve members 16 and 17 is abolished. The flow of pressurized fluid through the valve 15 then ceases.

The relative position of the inner and outer valve members 16 and 17 at which the servomotor is not affected by pressurized fluid to move the steered wheels may be referred to as a mutually neutral position of the valve members. The offset position of the valve members at which the pressurized fluid effects operation of the servomotor may be referred to as mutually operating positions. The outer valve member 17 may come, of course, depending upon the sense of direction of the torque applied to the work input shaft 1, be shifted from the mutually neutral position to either of two mutually operating positions to change the direction of operation of the servomotor in accordance with the sense of direction of the torque applied to the work input shaft 1.

As noted, the pinion 12 is disposed in respect of the axis of the work output shaft 2 between the torsionally resilient coupling 10 and the fluid flow control valve 15. Furthermore, the pinion 12 is formed directly on the work output shaft 2, the result of which is to simplify the construction of the entire assembly and substantially reduce space requirements. It will be appreciated that other forms of steering gear may be utilized in accordance with the principles of the present invention whereas, for example, the pinion 12 may engage a quadrant or other driven toothed element or may be replaced by a worm. Furthermore, the pinion 12 may be replaced simply by a drop-arm, in which kind of steering system the power assistance may be such as normally to apply virtually all of the steering load.

Although minor modifications may be suggested by those versed in the art, it should be understood that I wish to embody within the scope of the patent warranted hereon all such modifications as reasonably come within the scope of my contribution to the art.

I claim:
1. Power amplification apparatus for use in power-steering systems and the like having a mechanical work output linkage and a dual-acting pressurized fluid-operated servomotor associated with the mechanical work output linkage comprising:
   a casing having a fluid inlet port, a fluid outlet port and a pair of servomotor ports formed therein;
   a valve in said casing including a pair of relatively rotatable valve members for controlling the flow of pressurized fluid between said inlet port, said outlet port and said servomotor ports and movable alternatively from a mutually neutral position, at which the servomotor is rendered inoperative in respect of the pressurized fluid, in opposite directions to a pair of mutually operable positions, at which the servomotor is operated in a corresponding direction by the pressurized fluid;
   a work input shaft and a work output shaft both rotatably mounted in said casing;
   means connecting said shafts respectively to different ones of said valve members for joint rotation therewith;
   torsionally resilient coupling means rotatably interconnecting said work input and output shafts for limited relative rotation; and
   means formed on said work output shaft for mechanically operatively connecting the latter to the mechanical work output linkage;
   said last named means comprising a pinion for engaging a rack; and
   said means for connecting said work input shaft and its corresponding valve member comprising a nonstraining rod extending freely and coaxially through said pinion.
2. The apparatus as defined in claim 1 and including a rack journaled in said casing for engagement with said pinion.
3. Power amplification apparatus for use in power-steering systems and the like having a mechanical work output linkage and a dual-acting pressurized fluid-operated servomotor associated with the mechanical work output linkage comprising:
   a generally axial casing having a fluid inlet port, a fluid outlet port and a pair of servomotor ports formed therein and having said mechanical work output linkage mounted thereon;
   a work input shaft, a work output shaft and valve means mounted on said casing and arranged in the foregoing order along the axis of said casing;
   said work input shaft and said work output shaft being disposed in end-to-end relation and said valve means comprising a pair of relatively rotatable valve members for controlling the flow of fluid between said ports and movable from a mutually neutral position, at which the servomotor is rendered inoperative in respect of the pressurized fluid;
   in opposite directions to a pair of mutually operable positions, at which the servomotor is operated in a corresponding direction by the pressurized fluid;
   torsionally resilient coupling means interconnecting the adjacent ends of said work input and work output shafts for limited relative rotation;
   means interconnecting said work output shaft, said mechanical work output linkage and one of said valve members for concurrent movement; and
   means interconnecting said work input shaft and the other of said valve members for join rotation comprising an elongated rigid nonstraining rod extending axially across said work output shaft and connected fast at one end to said work input shaft and at the other end to said other valve member.
4. The invention as defined in claim 1 wherein said work output shaft and said torsionally resilient coupling means are centrally bored and said rod extends through the bores thereof.